United States Patent [19]

Nomura

[11] Patent Number: 5,267,299
[45] Date of Patent: Nov. 30, 1993

[54] AUTOMATIC ANSWERING TELEPHONE APPARATUS WITH DEVICE TO DETECT A REMOTE CONTROL PASSWORD

[75] Inventor: Atsushi Nomura, Yokohama, Japan

[73] Assignee: Matsushita Electric Industrial Co., Ltd., Osaka, Japan

[21] Appl. No.: 705,551

[22] Filed: May 24, 1991

[30] Foreign Application Priority Data

May 30, 1990 [JP] Japan .................. 2-140931

[51] Int. Cl.$^5$ .................. H04M 1/64; H04M 3/00
[52] U.S. Cl. .................. 379/88; 379/67; 379/188; 379/189; 340/825.31
[58] Field of Search .................. 379/67, 88, 89, 99, 379/188, 189; 340/825.31, 825.32, 825.34

[56] References Cited

U.S. PATENT DOCUMENTS 4,903,289 2/1990 Hashimoto .................. 379/67

FOREIGN PATENT DOCUMENTS

0207262 8/1988 Japan .................. 379/188

Primary Examiner—James L. Dwyer
Assistant Examiner—Fan Tsang
Attorney, Agent, or Firm—Stevens, Davis, Miller & Mosher

[57] ABSTRACT

An automatic answering telephone set comprises a voice synthesizing unit and a voice detector for reproducing a recorded message in response to a remote control performed by using a predetermined password number. A plurality of decoy numerals are inserted immediately before each of numerals constituting the preestablished password number to thereby form a pseudo-password number including the decoy numerals. A calling party is inquired of with the pseudo-password number. An input password number is then formed in accordance with replies of the calling party as detected by the voice detector. Only when coincidence is found between the predetermined password number and the input numerical password, the remote control is accepted.

4 Claims, 6 Drawing Sheets

AUTOMATIC ANSWERING TELEPHONE APPARATUS WITH DEVICE TO DETECT A REMOTE CONTROL PASSWORD

BACKGROUND OF THE INVENTION

The present invention relates generally to an automatic answering telephone set or apparatus which is capable of responding to a remote manipulation or control access made, for example, from an external public telephone set by using a password number (i.e. numerical password) to thereby reproduce a verbal or oral message or note recorded during the subscriber's absence so that an authorized person calling currently can aurally know the message. More particularly, the present invention is concerned with an automatic answering telephone set which can perform operation for verifying through collation the password number established previously for enabling the remote control or manipulation of the telephone set within a short time span while ensuring effectively the secrecy and security.

As the automatic answering telephone set designed to reproduce a message aurally comprehensibly in response to a request or access made from an external telephone apparatus by using a password number, there is generally known such automatic answering telephone sets in which specific remote control signal or DTMF signal is made use of as the password for authorizing the remote manipulation or control of the telephone set.

However, when the remote control signal is utilized as the password, a commander device dedicated to this end is required, which device has to be carried by the subscriber or authorized user whenever he or she leaves the place where telephone set is installed, incurring inconvenience in the use of the automatic answering telephone set. On the other hand, in case the DTMF signal is employed as the password, the remote control of the automatic answering telephone set can not be permitted from the other telephone set than that of a push-phone type, i.e. telephone set equipped with a push-button dial, to disadvantage.

For coping with the problems mentioned above, there has already been proposed a system which can operate without resorting to the use of the particular remote control signal or DTMF signal. This system will be described below in some detail for having a better understanding of the present invention.

According to the proposed system, the automatic answering telephone set is provided with a voice synthesizing unit and a voice detector, wherein a request of a calling party for reproduction of a message through remote control via a telephone circuit or line (or channel in more general sense) is answered by the voice synthesizing unit which phonates sequentially figures or numerals of "0" to "9", inclusive, one after another for the purpose of inquiring of the calling party, while the voice detector detects presence or absence of voice replies inputted by the calling party in response to the inquiries, whereon the numerals for which the voice replies have been detected (i.e. numerals of input password number) are compared with those of a password number established previously (hereinafter referred to as the preestablished password number). Only when coincidence is resulted from the comparison, the remote manipulation or control for inputting of a message to the telephone set as well as reproduction of a message is permitted.

Figure 6:
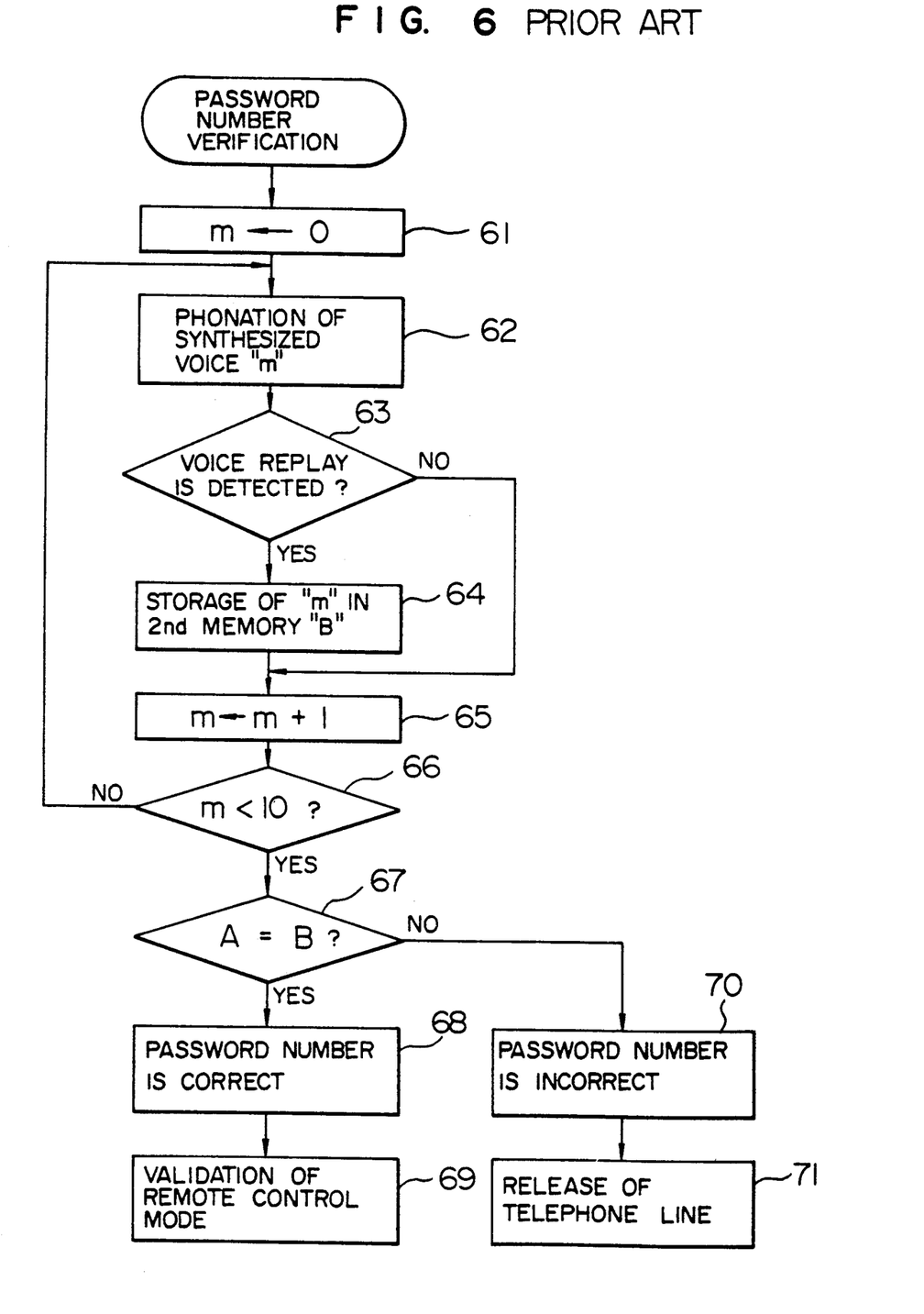
FIG. 6 is a flow chart for illustrating operation of an automatic answering telephone set known heretofore.

FIG. 6 of the accompanying drawings shows a flow chart for illustrating a password number verification procedure adopted in a prior art automatic answering telephone set in which a voice signal is employed.

In the case of the automatic answering telephone set under consideration, a password number "A" is previously established by using a number n of numerals selected from "0" to "9" (where n represents an integer given by $1<n<9$). To say in another way, the preestablished password is constituted by a string of n numerals or figures (i.e. an n-digit number).

Referring to FIG. 6, a voice synthesizing unit incorporated in the automatic answering telephone set phonates sequentially ten numerals of "0" to "9" (generally represented by m) in this order in response to a calling party's request for reproducing a message through the remote control via the telephone line, whereon phonation of the abovementioned ten numerals of "0" to "0" are repeated a number of times which corresponds to the number of the numerals contained in the preestablished password number "A" (i.e. n times in the case of this example), as indicated at steps 61 and 62 in FIG. 6. Every time the ten numerals are phonated successively and discretely by the voice synthesizing unit, detection is performed by the voice detector as to which of the ten numerals the calling party inputs voice reply for. Only when the voice reply is detected (step 63), the relevant numeral is stored. In this way, there are stored n numerals in the order of the voice replies made by the calling party.

More specifically, the calling party will reply with, for example, "YES" every time he or she encounters the numeral constituting the preestablished password "A" in the course of hearing the numerals of "0" to "9" generated by the voice synthesizing unit. By repeating this operation n times corresponding to the n numerals selected from "0" to "9" for constituting the preestablished password "A", the automatic answering telephone set can generate an input password number "B" constituted by a series of n numerals for which the calling party has replied in the corresponding order (steps 62, 63, 64, 65 and 66).

Subsequently, the input password number "B" is compared with the preestablished password number "B" (step 67), wherein when the comparison results in coincidence, it is decided that the password number is correctly inputted (step 68). Thus, the automatic answering telephone set is changed over to a remote control or manipulation mode (step 69), whereby the calling party is allowed to perform the remote control via the telephone line for reproduction and hearing of a message, if any.

On the other hand, when the comparison shows that the inputted password number "B" differs from the preestablished password number "A" at the step 67, decision is made that the inputted password number is incorrect (step 70). In that case, the voice synthesizing unit of the automatic answering telephone set may phonate, for example, "Password is not correct. Please reply correctly.", whereon the operation described above may be repeated. Unless the correct password number is inputted even after repetition of the abovementioned operation for a predetermined number of times or even after lapse of a predetermined time, the telephone line is released to thereby disenable the remote control, as indicated at a step 71.

As will now be understood, the prior art automatic answering telephone set is certainly capable of reproducing a recorded oral message with the aid of the password number.

At this juncture, it should be mentioned that the remote control or manipulation is never restricted to the reproduction and hearing of the oral message recorded during the subscriber's absence but may be performed for a variety of functions and operations such as fast-feeding for reproduction, rewinding for reproduction, erasing of record in an automatic responsive recorder, alteration of message to be answered in response to the call, setting and resetting of transfer function, room monitor function and others.

In conjunction with the automatic answering telephone set known heretofore, it is however noted that the voice synthesizing unit has to phonate the series of numerals of "0" to "9" repeatedly for n times for verification of the password number constituted by n numerals (i.e. password of an n-digit number), while the calling party must select the numerals constituting parts of the password number "A" in the course of repetitive generation of the abovementioned numeral series and reply with voice every time the relevant numeral is encountered. Under the circumstances, there arises a problem that a lot of time is taken for the verification of the password number.

Besides, an additional problem is pointed out recently that an unauthorized person who could not inherently know the password number can manipulate or control remotely the automatic answering telephone set.

SUMMARY OF THE INVENTION

In the light of the state of the art described above, it is an object of the present invention to provide an automatic answering telephone apparatus of a type which includes a voice synthesizing unit and a voice detector and which is capable of performing operation for verifying through collation the password number within a relatively short time while inhibiting effectively illegal access to the telephone set by an unauthorized person who does not naturally know the password number.

For achieving the above object, there is provided according to an aspect of the invention an automatic answering telephone set or apparatus for automatically responding to a call incoming via a telephone circuit by sending out an answer message and recording subsequently an oral message sent from a calling party, if any, wherein the telephone apparatus is so arranged as to reproduce aurally comprehensibly a recorded oral message in response to a remote control performed by using a predetermined password number and comprises a voice synthesizing unit for generating voice signals to answer and inquire of a calling party, a voice detector for detecting presence or absence of voice reply from the calling party, a first memory for storing a predetermined password number constituted by at least a series of numerals, a random number generator for generating as a random number a plurality of decoy numerals to be inserted immediately before each of the numerals constituting the predetermined password number to serve as decoy for thereby forming a pseudo-password number./a second memory for storing sequentially voice replies inputted by the calling party in response to the numerals constituting the pseudo-password number inclusive of the decoy numerals, wherein the numerals inclusive of the decoy numerals are sequentially generated in voice by the voice synthesizing unit for inquiring of the calling party, while the voice replies stored sequentially constitute an input password number, and a collation unit for comparing the input password number with the predetermined password number to thereby authorize the remote control to be performed only when the comparison results in coincidence.

Thus, according to the teaching of the present invention, the voice synthesizing unit phonates the individual numerals of the pseudo-password number generated by the random number generator in place of generating phonatorily a series of numerals "0" to "9" sequentially in this order as with the case of the prior art telephone set. On the other hand, the calling party can select the numerals constituting the password number sequentially from those constituting the pseudo-password number and make corresponding replies in voice to thereby supply the input password number to the telephone set.

Further, by virtue of incorporation of the random number generator, there can be generated the numerals which become different from one to another verifying operation, whereby remote control by an unauthorized party can positively be prevented.

The automatic answering telephone set according to the present invention is remotely controlled or manipulated by inputting the password number only through phonation or in voice. In conjunction with the remote control or manipulation, a plurality of numerals generated in the form of a random number to serve as decoy are inserted immediately before each of the digits of the preestablished password number registered previously every time the input password number is to be inputted, wherein the calling party is forced to select the numerals constituting the preestablished password number from those of the pseudo-password number containing the decoy numerals, which is then followed by collation of the input password number with the preestablished password number. By virtue of this arrangement, it is substantially impossible for an unauthorized person to know illegally the preestablished password number. By decreasing the number of the decoy numerals, the time taken for the verification of the password numbers can correspondingly be shortened. On the other hand, by increasing even slightly the number of the decoy numerals, the possibility of the telephone set being remotely manipulated by the unauthorized person can further be suppressed. It should be added that the maximum digit number of the decoy numerals can be selected arbitrarily, to another advantage.

DESCRIPTION OF THE PREFERRED EMBODIMENTS

An exemplary or preferred embodiment of the automatic answering telephone set according to the present invention will now be described in detail by reference to FIGS. 1 to 5.

Figure 1:
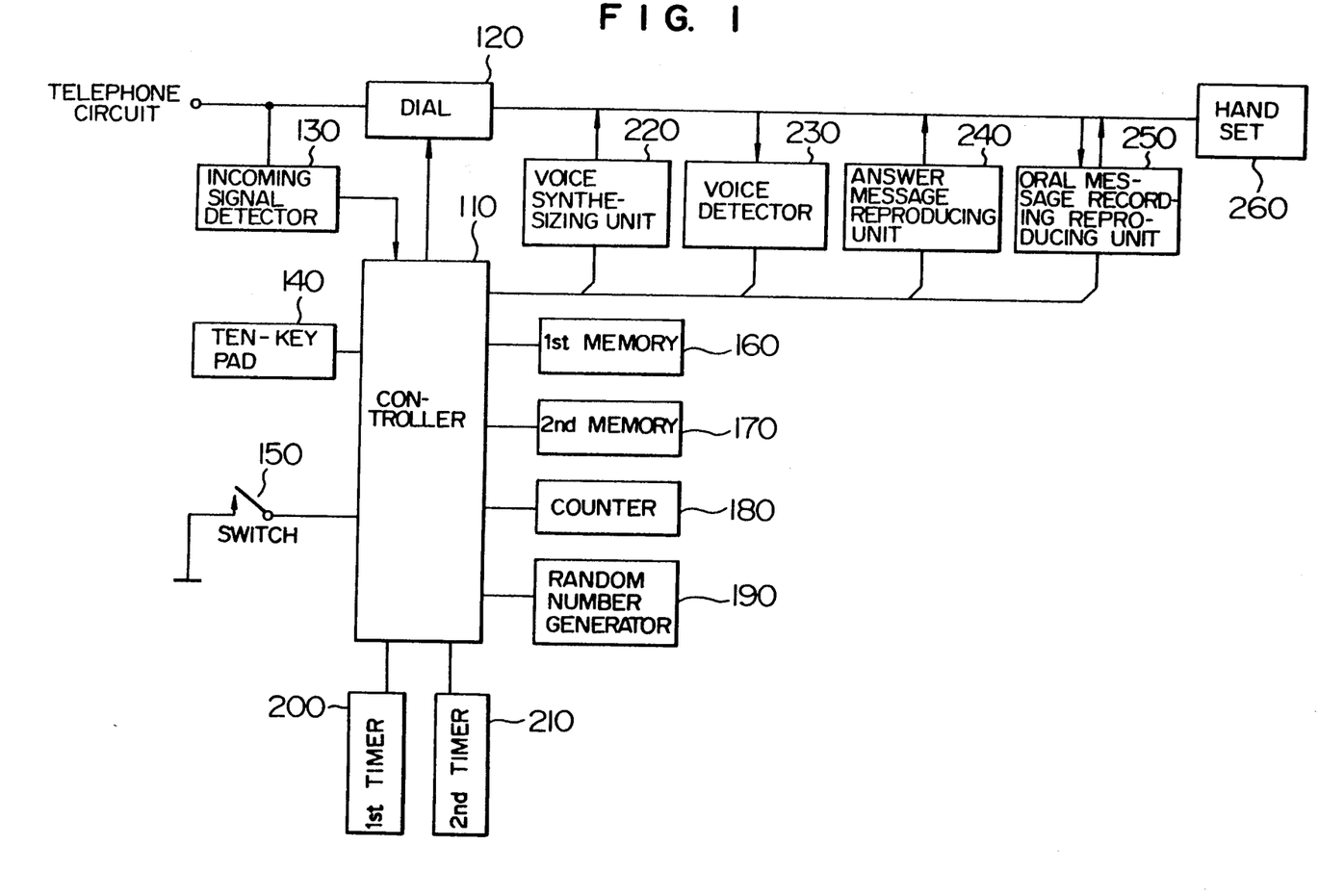
FIG. 1 is a block diagram showing a general arrangement of an automatic answering telephone set according to an exemplary embodiment of the present invention.

FIG. 1 is a functional block diagram showing schematically a general arrangement of the automatic answering telephone set.

Referring to FIG. 1, all parts constituting the automatic answering telephone set are under the control of a controller 110. A dial 120 serves for establishing a telephone circuit or channel (hereinafter also referred to as the telephone line or simply as the line) as well as for sending dial signals. An incoming signal detector 130 serves to detect signals incoming via the telephone line closed. A ten-key pad 140 is used for inputting numbers such as a dial number, password numbers and others.

A reference numeral 150 denotes a switch which is used for registering the password number. More specifically, when this switch 150 is in the closed state, a password number as desired can be inputted with the aid of the ten-keys 140 to be subsequently registered under the control of the controller 110. (The password number thus registered is referred to as the preestablished password number.) For storing the preestablished password number, there is provided a first memory 160. On the other hand, a second memory 170 is destined for storing an input password number originating in a calling party for the purpose of collating it with the preestablished password number.

A counter 180 serves for decrementing a number set therein by the controller 110. A random number generator 190 generates a random number including integers selected from a group of "0" to "9". A first timer 200 responds to the start of a call in an automatic recording mode by counting, for example, 10 seconds for the purpose of affording a time to the calling party for reply. A second timer 210 counts, for example, one minute as a time required for recording an oral message in succession to the reply.

A voice synthesizing unit 220 responds to a command issued by the controller 110 by synthesizing a variety of voices and speeches. A voice detector 230 smoothes an audio input signal incoming via the telephone line and compares the smoothed signal level with a predetermined threshold level for thereby detecting the presence or absence of the voice signal of the calling party on the line. An answer message reproducing unit 240 reproduces an oral message stored previously and sends the reproduced message onto the line. An oral message recording/reproducing unit 250 serves for recording the oral message incoming via the line and/or reproducing an oral message recorded therein to send it onto the line. Voice communication is performed by a receiver/transmitter which may be constituted by a hand set 260.

In the automatic answering telephone apparatus described above, a preestablished password number is registered through preparatory operation.

More specifically, the switch 150 is turned on (closed), whereon a numeral string or number of x digits selected arbitrarily for constituting the preestablished password number (where x represents an integer) is inputted through manipulation of the ten keys 140. The controller 110 then registers the preestablished password number of x digits by storing it in the first memory 160. In the case of the illustrated embodiment of the invention, it is assumed, by way of example only, that the preestablished password number of x digits as registered is a three-digit number, say "582". In other words, the value of x (i.e. the number of digits) is three.

Now, referring to flow charts shown in FIGS. 2 to 5, the automatic answering operations inclusive of password number verifying operation of the automatic answering telephone set having the structure described above will be elucidated by referring to flow charts shown in FIGS. 2 to 5.

Figure 2:
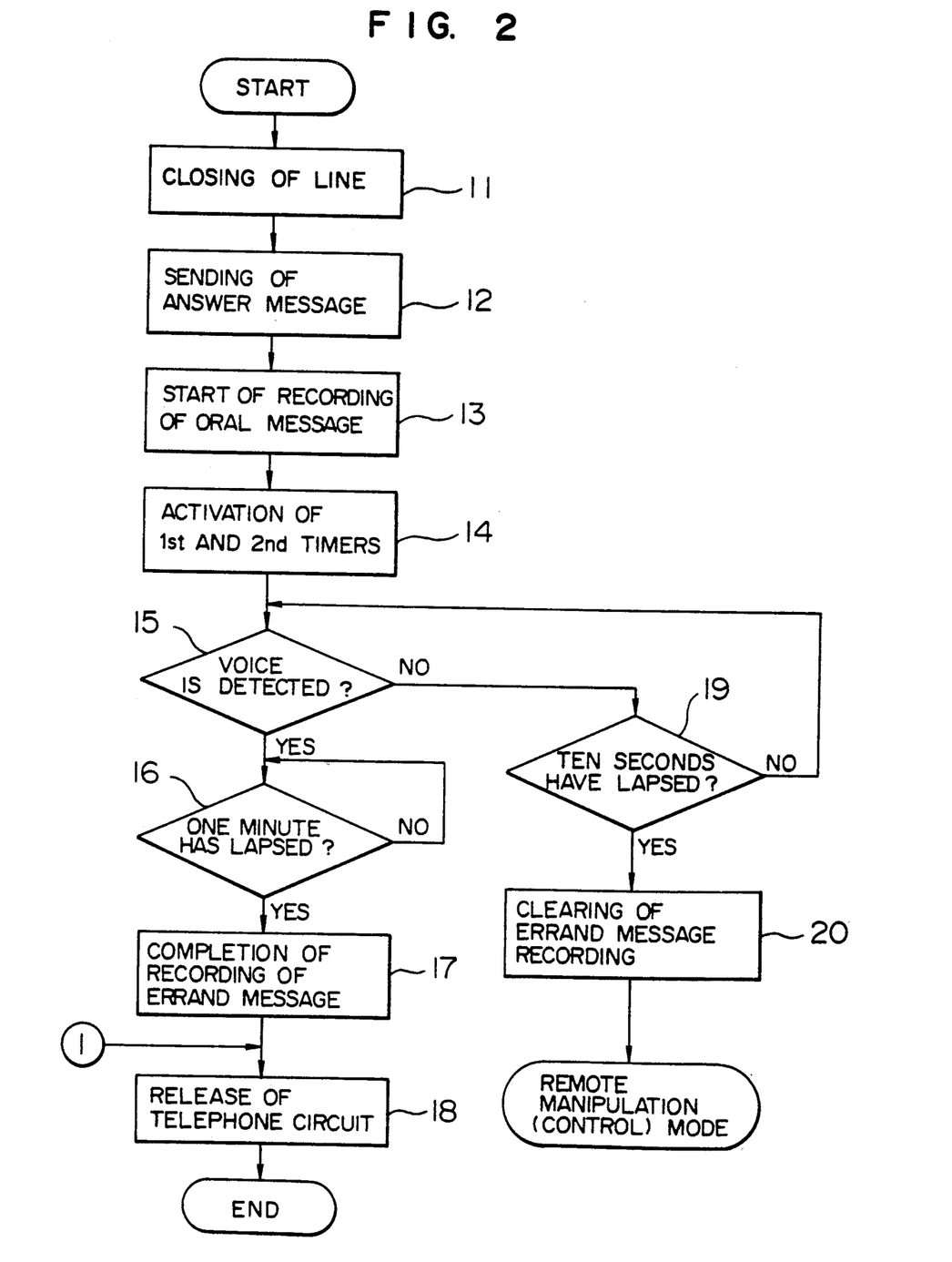
FIGS. 2 to 5 are flow charts for illustrating operations of the automatic answering telephone set shown in FIG. 1.

At the beginning, description will be directed to an ordinary automatic answering operation by reference to the flow chart shown in FIG. 2.

The telephone set is in the stand-by state in the automatic answering operation mode. In this state, assuming that a call is issued exteriorly, an ordinary ringing signal is first detected by the incoming signal detector 130, and that the dial 120 is controlled by the controller 110 in response to the detection of the ringing signal to close the telephone line (step 11). Subsequently, the answer message reproducing unit 240 sends out an answer message recorded previously onto the line and hence to the calling party at a step 12, which is then followed by a step 13 where a recording mode is validated. In this conjunction, the answer message may be "Now absent. Please tell what you want with.". In precedence to the recording, a time period not longer than ten seconds is set at the first timer 200 for affording the time required for the calling party to prepare his or her oral message to be sent, while a time period (e.g. not longer than one minute) for allowing the oral message to be recorded is set at the second timer 210.

Thereafter, the oral message recording/reproducing unit 250 starts reception and recording of the oral message sent from the calling party (step 13). At the same time, count-down operations of the first timer 200 and the second timer 210 are triggered (step 14). When the calling party starts to input phonatorily an oral message or note within the period of ten seconds monitored by the first timer 200, the voice detector 230 detects the presence of voice (step 15) for thereby allowing the message recording/reproducing unit 250 to record the oral message. Upon lapse of the time of one minute set at the second timer 210 (step 16), recording of the oral message comes to an end (step 17), being then followed by resetting of the recording mode and releasing of the telephone line, whereon the automatic answering telephone set resumes the stand-by state (step 18).

On the other hand, when it is detected at the step 15 that the calling party has uttered nothing within the period of ten seconds from the time point when the recording of the message by the oral message recording/ reproducing unit 250 was started at the step 13 with the first and second timers 200 and 210 having started in succession the count-down of the respective set times at the step 14, this means that the voice detector 230 detects the absence of voice, whereon the controller 110 makes decision upon lapse of ten seconds set at the first timer 200 (step 19) that the calling party dares to remain silent because he or she wants to control or manipulate remotely the automatic answering telephone apparatus. Thus, the oral message recording mode is reset at a step 20, and a remote control or manipulation mode is then validated.

Figure 3:
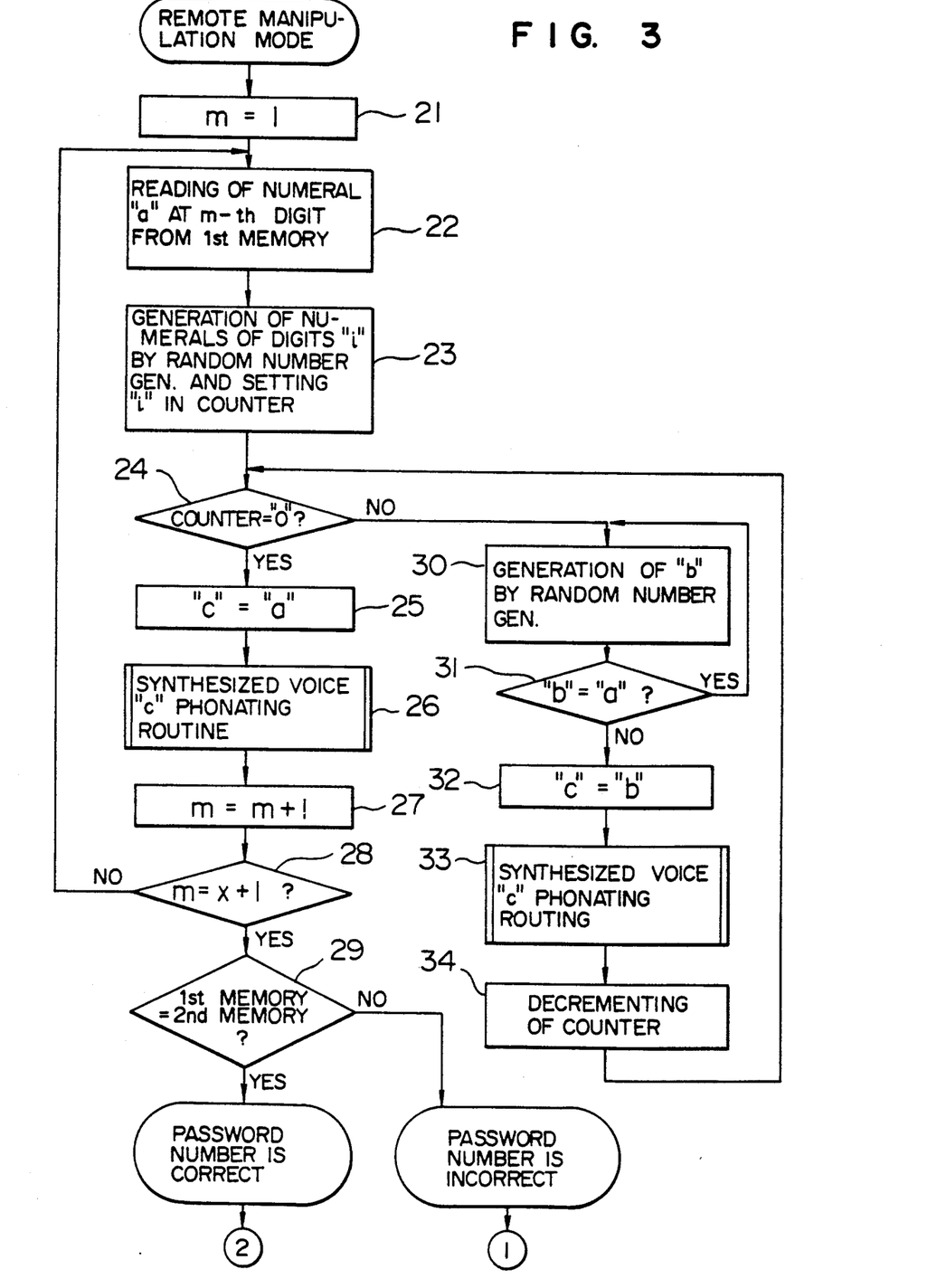
Figure 4:
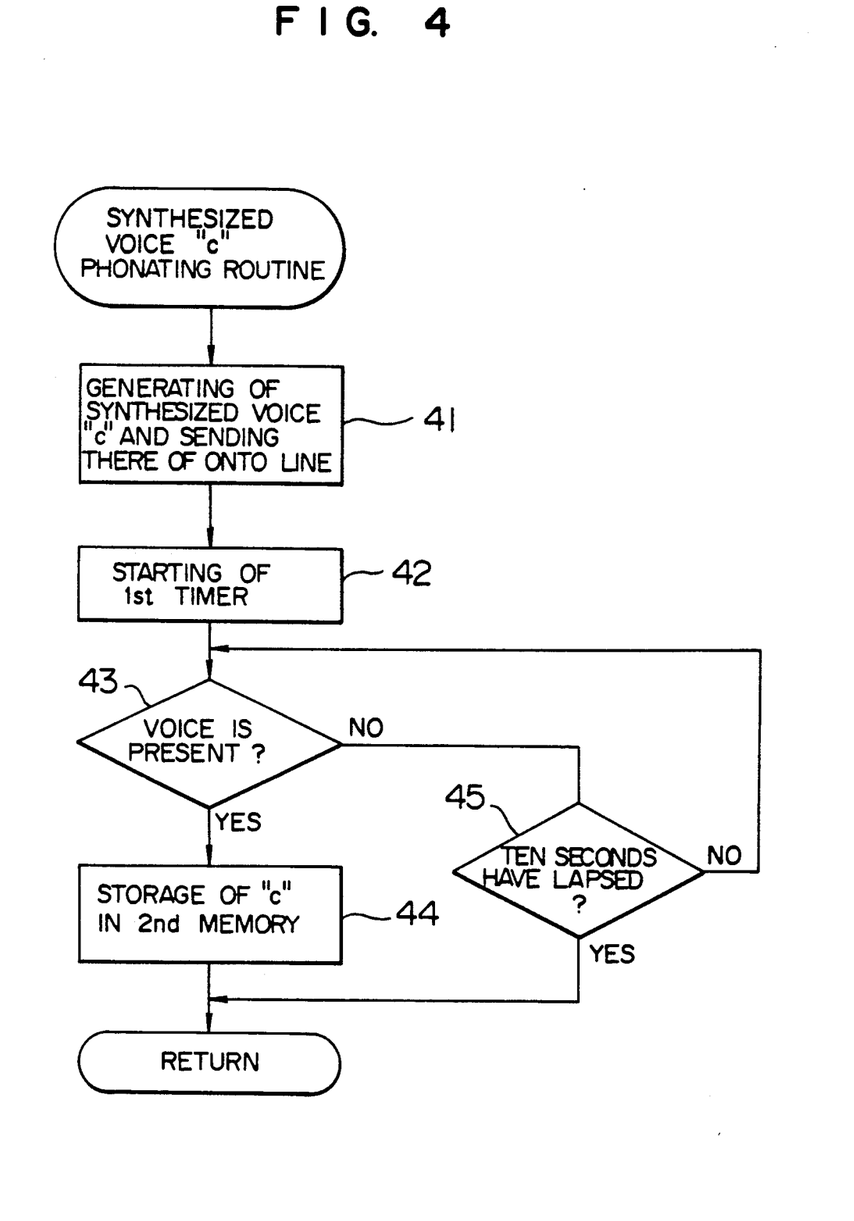

Next, description will be turned to operation for verifying the password number inputted orally by reference to the flow charts shown in FIGS. 3 and 4.

The password number collating/verifying operation is performed in the abovementioned remote manipulation mode.

At the beginning, the controller 110 places "1" in a variable m which represents significance of a digit or position of a numeral constituting a part of the preestablished password number relative to the most significant digit (step 21). The operation described below is effected repetitively a number of times which corresponds to the number of numerals constituting the preestablished password number by placing ordinal numbers in the variable m for each of the most significant digit to the least significant digit of the password number. The controller 110 reads out from the first memory 160 a numeral "a" at the m-th digit as counted from the most significant one of the preestablished password number.

Next, the controller 110 triggers operation of the random number generator 19 which then generates a preselected number of digits i of numerals destined to serve as so-called decoy numerals which are to be inserted immediately before each of the individual numerals of the preestablished password number, the digit number i thus generated being then placed in the counter 180 shown in FIG. 1 (step 23). The number of the digits for the decoy numerals may be selected to be an integer not greater than three, by way of example. In this manner, i numerals are placed as the decoy immediately before the numeral "a" at the m-th digit of the preestablished password number.

Subsequently, the controller 110 checks the value contained in the counter 180 (step 24). When the value of concern is other than "0" (zero), the controller 110 then causes the random number generator 190 to generate a decoy numeral "b" to be inserted in precedence to the numeral "a" of the preestablished password number (step 30). Thereafter, it is checked whether or not the decoy numeral "b" differs from the numeral "a" of the password number (step 31). When difference is found, the decoy numeral "b" is placed in data to be synthesized to voice "c" (step 32), whereon the processing branches to a synthesized voice generating routine (step 33).

In the synthesized voice "c" generating routine (step 33 in FIG. 3), the voice synthesizing unit 220 generates the synthesized voice "c" under the command of the controller 110, whereby the synthesized voice signal "c" is sent out onto the telephone line to be transmitted to the calling party for inquiry. At the same time, the first timer 200 is started (step 42). Hearing this synthesized voice "c", the calling party may answer "YES" in voice in case he or she considers the synthesized voice "c" as representing the numeral at a predetermined digit of the registered preestablished password number as counted from the most significant digit and representing no decoy numeral. The voice detector 230 then detects the voice reply "YES" (step 43).

In that case, the controller 110 decides that the synthesized voice "c" represents a numeral of the password number which is inputted by the calling party for verification and stores the numeral corresponding to the synthesized voice "c" in the second memory 170 (step 44). On the other hand, when the calling party considers the synthesized voice "c" as representing the decoy numeral, the former may remain silent without uttering any answer for ten seconds until the count set at the first timer 200 has been counted down to zero.

Subsequently, the controller 110 decrements the counter 180 by one. The operation described above is repeated to insert other decoy numerals until the value of the counter 180 has been counted down to zero (step 34). At the time when the content of the counter 180 becomes zero, the controller 110 places the numeral "a" in the synthesized voice "c" (step 25), whereon the processing branches to the synthesized voice "c" generating routine (step 26) for executing again the operation described hereinbefore for generating the synthesized voice "c" containing the numeral "a".

When the controller 110 confirms that the operation described above has been performed repeatedly for the number of times corresponding to the number "x" of the numerals which constitute the preestablished password number (steps 27 and 28), the controller 110 then compares the registered preestablished password number loaded in the first memory 160 with the string of numerals stored in the second memory 170 (i.e. the inputted password number) to make a decision that the calling party knows the correct password number, when coincidence is resulted from the abovementioned comparison (step 29).

The password number collating operation will be described below in more detail.

By way of example only, let's assume that the preestablished password number is "582" and stored in the first memory 160.

On the above assumption, the control unit 110 first reads out the numeral at the most significant digit of the preestablished password number "582", i.e. the first numeral "5" as counted from the leftmost digit. Subsequently, the control unit 110 determines that the number of numerals for decoy is two, whereon the numerical data "two" is loaded in the counter 180. Consequently, the two numerals for decoy which are other than "5" are to be inserted in precedence to the figure "5" of the password number.

It is again assumed that the numeral of the more significant digit generated first by the random number generator 19 is "3". In that case, the voice synthesizing unit 220 generates voice information representing the decoy numeral "3" which is then sent out onto the line to be transmitted to the calling party for inquiry. Hearing the voice information of "3", the calling party will answer "YES" when he or she thinks erroneously that this voice information represents the first numeral of the preestablished password number as counted from the leftmost digit. The voice reply "YES" is detected by the voice detector 230, whereon the controller 110 stores in the second memory 170 the numeral "3" for which the reply of the calling party was "YES". As will readily be understood, the second memory 170 is loaded with the inputted password number which differs from the preestablished password number registered previously in the first memory 160. Consequently, the calling party is deemed to be an unauthorized person or illegal invader, resulting in that the telephone line is opened or released for preventing the illegal invasion of the person calling currently, as will be described later on.

However, when the calling party is the very person that has registered the preestablished password number or a person who can legally make access to the automatic answering telephone set by making use of the authentic password number, he or she can readily recognize that the voice information "3" mentioned above is not the leftmost numeral of the preestablished password number and will thus remain silent. In this case, the control unit 110 decides that no reply in voice is present and inhibits the numeral "3" from being stored in the second memory 170. Subsequently, the control unit 10 decrements the counter 180 and confirms that the counter 180 has not been counted down to zero yet. Subsequently, similar operation is performed by operating the random number generator 19. The value of the counter 180 thus become "0".

Now, the control unit 110 performs similar operation on the numeral "5" which is intrinsically at the most significant digit of the preestablished password number "582". At this time, if the calling party is the person who has registered the preestablished password number or who is authorized to make access to the telephone set now under consideration, he or she will input orally the reply "YES", which results in that the numeral "5" is stored in the second memory 170 at the leftmost position.

Similar operation is performed on the numeral of the intermediate or second leftmost digit, i.e. "8" and the numeral "2" of the least significant digit in the preestablished password number "582", whereby there are stored in the second memory 170 a string of numerals "5", "8" and "2" in case the calling party is the person by whom the preestablished password number has been registered or a person who is authorized to address, as a result of which the number "582" is inputted as the input password number. On the contrary, when the calling party is an unauthorized person or invader who does not know the preestablished password number, possibility of this password "582" being inputted correctly as the input password number is extremely low, which in turn means that the password can serve for its intrinsic function sufficiently and satisfactorily.

At the time point when the input password number has been completely loaded in the second memory 170 through the procedure described above, the control unit 110 compares the input password number now held in the second memory 170 with the preestablished password number stored in the first memory 160 (step 29). When coincidence is resulted from the comparison, it is then decided that the calling party is a person who registered the preestablished password or who is authorized to make access to the telephone set, whereupon the remote manipulation mode is validated for regenerating the oral message of concern to be aurally recognized by the calling party. On the other hand, when the comparison mentioned above results in discrepancy, decision is made that the calling party is an unauthorized person who is illegally attempting the remote manipulation without knowledge of the preestablished password, whereon the line is released.

As will now be appreciated, with the arrangement described above, it is possible to perform the password collating operation only through the medium of voice information. Further, the number of the decoy numerals can be made relatively smaller, whereby the time taken for the verification can correspondingly be shortened. In order that the possibility of the remote manipulation being executed by invader or an unauthorized outsider be lowered close to zero, the number of the decoy numerals may further be increased. In this conjunction, it will readily be understood that the number of the decoy numerals can arbitrarily be selected by the authentic user who registers the preestablished password number or a related person.

Figure 5:
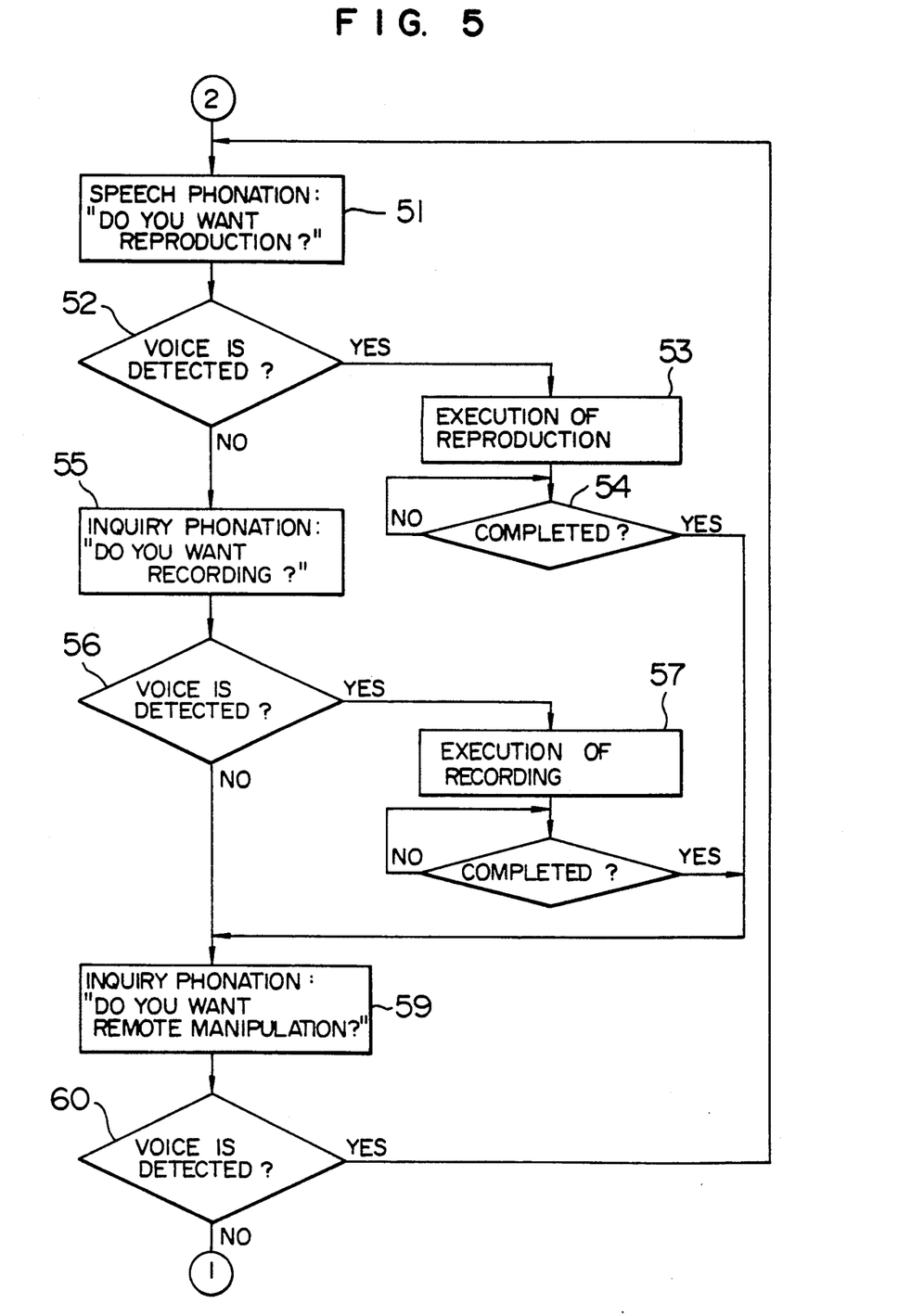

Now referring to the flow chart shown in FIG. 5, description will be turned to the oral message reproducing/hearing operation after the telephone apparatus has been set to the remote manipulation mode.

In the case of the automatic answering telephone apparatus according to the illustrated embodiment of the invention, it is assumed that the concerned functions in the remote manipulation mode are reproduction of the oral message and recording thereof. Further, it is assumed that the voice synthesizing unit 220 is capable of generating voice inquiries "Do you want reproduction ?", "Do you want recording ?" and "Do you want remote manipulation ?" under the command of the control unit 110.

When it is decided at the step 29 shown in FIG. 3 that the correct password number has been inputted by the calling party, the remote manipulation mode (FIG. 5) is validated, whereon the voice inquiry "Do you want reproduction ? " is generated by the voice synthesizing unit 220 to be sent to the calling party via the line (step 51). The calling party may respond to this voice inquiry by saying "YES" when he or she wants to know the oral message or messages which might have been recorded up to that time. The voice detector 230 then detects the voice reply "YES" (step 52), and the controller unit 110 controls the oral message recording/reproducing unit 250 so that the oral message or messages recorded up to that time are reproduced to be sent onto the telephone line (step 53). Upon completion of the reproducing operation (step 54), the voice synthesizing unit 220 then issues the voice inquiry "Do you want remote manipulation ?" (step 59). When the calling party remains silent in response to this inquiry (step 60), it is then regarded that the remote manipulation has been performed by the calling party, whereupon this routine comes to an end by releasing the telephone line (step 18 in FIG. 2). The automatic answering telephone apparatus is then set to the stand-by state.

When the calling party remains silent at the step 52, decision is made that the calling party does not want the reproduction. In that case, the voice synthesizing unit 220 sends onto the line the voice inquiry "Do you want recording ?" (step 55). When the calling party desires recording, he or she may orally input the reply "YES". The voice detector 230 then detects this voice reply (step 56), and the controller unit 110 controls the oral message recording/reproducing unit 250 to record the oral message incoming from the calling party (step 57). Upon completion of the recording operation (step 58), the previously mentioned step 59 is resumed. At this step 59, the calling party may again say "YES" as reply in response to the voice inquiry "Do you want remote manipulation ?", when he or she desires the reproduction or recording once more. The voice reply is detected by the voice detector 230, whereon the return is made to the first step 51.

As will now be appreciated from the foregoing description, it is taught according to the present invention that a plurality of so-called decoy numerals generated in the form of a random number is inserted immediately before each of the numerals which constitute a password number to thereby form a sort of pseudo-password. The individual numerals of the password are generated in voice one by one to be successively sent out onto the telephone line. When the affirmative reply "YES", for example, is sent back from the calling party, the input voice information is then compared with the numeral of the preestablished password number for the purpose of verification. In contrast, in the case of the automatic answering telephone apparatus known heretofore, the inputting of the password number is executed by generating aurally comprehensibly the numerals "0" to "9" in succession for each of the numerals which constitute the password, wherein voice replies of the calling party such as "YES", for example, are checked for verification of the input password.

More specifically, assuming that a password is constituted by a combination of three digits of numerals, say "582", the voice synthesizing unit generates a series of "0", "1", "2", ..., "8", "9" for each of the numerals "5", "8" and "2", respectively. In other words, the numeric sequence of "0" to "9" is generated three times in total for the password number of three digits, which in turn means that thirty numerals in total must be repetitively generated in voice for the above password. In contrast, according to the teachings of the invention incorporated in the illustrated embodiment, only a few decoy numerals up to three at maximum need to be generated in voice immediately before each of the numerals (digits) constituting the password, which means that for a password of three numerals, it is sufficient to generate only twelve numerals in total including nine numerals serving as decoy and three intrinsic numerals of the passwords. As a result of this, the time taken for operation to verify the numeric password can significantly be shortened to great advantage. Besides, because of possibility of changing arbitrarily the number of the numerals for decoy, not only the time required for the verification can further be reduced but also the probability of the telephone apparatus being manipulated remotely by an unauthorized person who does not know the password can be suppressed to a possible minimum.

I claim:

1. An automatic answering telephone apparatus comprising:

(a) voice generating means for generating voice signals to answer and inquire of a calling party;
   (b) oral message detecting means for detecting presence or absence of oral messages from the calling party;
   (c) first storage means for storing a password including a plurality of symbols;
   (d) pseudo-password generating means including a random symbol generating means for randomly generating a plurality of decoy symbols to serve as decoys, said pseudo-password generating means inserting some of said decoy symbols immediately before each of said plurality of symbols constituting said predetermined password to form a pseudo-password including a plurality of symbols;
   (e) voice detecting means for detecting an input password from said calling party, said input password including a plurality of symbols, by discriminating presence or absence of voice signals form said calling party in response to sequential generation of each of the symbols constituting said pseudo-password including said decoy symbols by said voice generating means in order to inquire of said calling party, said presence or absence of voice signals being controlled by said calling party to indicate whether said calling party considers individual ones of said symbols constituting said pseudo-password as representing said predetermined password;
   (f) second storage means for storing said symbols of said input password in response to presence of said voice signals detected by said voice detecting means;
   (g) means for comparing one or more of said symbols of said input password with symbols in corresponding digits of said predetermined password; and
   (h) means, responsive to a determination by said means for comparing that said input password and said predetermined password are identical, for aurally reproducing said oral messages detected by said oral message detecting means.

2. An automatic answering telephone apparatus comprising:

(a) voice generating means for generating voice signals to answer and inquire of a calling party;
   (b) oral message detecting means for detecting presence or absence of oral messages form the calling party;
   (c) first storage means for storing a predetermined password including a plurality of symbols;
   (d) pseudo-password generating means including a random symbol generating means for randomly generating a plurality of decoy symbols to serve as decoys, said pseudo-password generating means inserting some of said decoy symbols immediately before each of said symbols constituting said predetermined password to form a pseudo-password including a plurality of symbols;
   (e) voice detecting means for detecting an input password from said calling party, said input password including a plurality of symbols, by discriminating presence or absence of voice signals from said calling party in response to sequential generation of each of the symbols constituting said pseudo-password including said decoy symbols by said voice generating means in order to inquire of said calling party, said presence or absence of voice signals being controlled by said calling party to indicate whether said calling party considers individual ones of said symbols constituting said pseudo-password as representing said predetermined password;
   (f) second storage means for storing said symbols of said input password in response to presence of said voice signals detected by said voice detecting means;
   (g) means for comparing one or more of said symbols of said input password with symbols in corresponding digits of said predetermined password; and
   (h) means, responsive to a determination by said means for comparing that said input password and said predetermined password are identical, for enabling the calling party thereafter to sue a telephone line of said telephone apparatus.

3. An automatic answering telephone apparatus according to claim 1 further comprising means for putting said telephone apparatus into a remote control mode when a voice signal to answer a calling party is sent out and thereafter no oral message is received from the calling party for a predetermined time.

4. An automatic answering telephone apparatus for automatically responding to a call incoming via a telephone channel by sending out an answer message and recording subsequently an oral message sent from a calling party, if any, said telephone apparatus being further so arranged as to reproduce aurally comprehensibly an oral message in response to remote control performed by said calling party by using a predetermined password and comprising:

(a) voice generating means for generating voice signals to answer and inquire of a calling party;
   (b) oral message detecting means for detecting presence or absence of oral messages form the calling party;
   (c) first storage means for storing a predetermined password including a plurality of symbols;

(d) pseudo-password generating means including a random symbol generating means for randomly generating a plurality of decoy symbols to serve as decoys, said pseudo-password generating means inserting some of said decoy symbols immediately before each of said symbols constituting said predetermined password to form a pseudo-password including a plurality of symbols;

(e) voice detecting means for detecting an input password from said calling party, said input password including a plurality of symbols, by discriminating presence or absence of voice signals from said calling party in response to sequential generation of each of the symbols constituting said pseudo-password including said decoy symbols by said voice generating means in order to inquire of said calling party, said presence or absence of voice signals being controlled by said calling party to indicate whether said calling party considers individual ones of said symbols constituting said pseudo-password as representing said predetermined password;

(f) second storage means for storing said symbols of said input password in response to presence of said voice signals detected by said voice detecting means; and (g) means for comparing one or more of said symbols of said input password with symbols in corresponding digits of said predetermined password to thereby authorize said remote control to be performed only in response to a determination by said means for comparing that said input password and said predetermined password are identical.

* * * * *